(12) United States Patent
Ellis et al.

(10) Patent No.: US 10,619,078 B2
(45) Date of Patent: Apr. 14, 2020

(54) ADHESIVE COMPOSITIONS AND USE THEREOF

(71) Applicants: HENKEL AG & CO. KGAA, Duesseldorf (DE); HENKEL IP & HOLDING GMBH, Duessledorf (DE)

(72) Inventors: Richard Ellis, High Wycombe (GB); Charles W. Paul, Morristown, NJ (US); Dirk Kasper, Duesseldorf (DE); Petra Padurschel, Monheim a.Rh (DE); Andrea Eodice, Hillsborough, NJ (US)

(73) Assignees: HENKEL AG & CO. KGAA, Dusseldorf (DE); HENKEL IP & HOLDING GMBH, Dusseldorf (DE)

( * ) Notice: Subject to any disclaimer, the term of this patent is extended or adjusted under 35 U.S.C. 154(b) by 14 days.

(21) Appl. No.: 15/631,145

(22) Filed: Jun. 23, 2017

(65) Prior Publication Data
US 2017/0283668 A1  Oct. 5, 2017

Related U.S. Application Data (60) Division of application No. 14/697,094, filed on Apr. 27, 2015, now Pat. No. 9,783,703, which is a
(Continued)

(51) Int. Cl.
*C09J 123/14* (2006.01)
*C09J 123/18* (2006.01)
(Continued)

(52) U.S. Cl.
CPC .......... *C09J 123/142* (2013.01); *C08L 91/00* (2013.01); *C09J 7/21* (2018.01); *C09J 7/243* (2018.01);
(Continued)

(58) Field of Classification Search
CPC ..... C09J 123/142; C08L 23/142; C08L 91/00; C08L 91/06; C08L 91/08
See application file for complete search history.

(56) References Cited

U.S. PATENT DOCUMENTS

| 4,233,432 A | 11/1980 | Curtis, Jr. |
| 4,897,452 A * | 1/1990 | Berrier .................... B29C 48/92 525/333.8 |

(Continued)

FOREIGN PATENT DOCUMENTS

| CN | 1323335 A | 11/2001 |
| EP | 0472946 A2 | 3/1992 |

(Continued)

OTHER PUBLICATIONS

Abraham, Frank et al., "Synthesis and Structure—Efficiency Relations of 1,3,5-Benzenetrisamides as Nucleating Agents and Clarifiers for Isotactic Poly(propylene)", Macromol. Chem. Phys., Wiley-VCH Verlag GmbH & Co. KGaA, Jan. 19, 2010, vol. 211, pp. 171-181.

(Continued)

*Primary Examiner* — Nicholas E Hill
(74) *Attorney, Agent, or Firm* — Sun Hee Lehmann (57) ABSTRACT

The invention provides adhesives comprising at least one polymer component which contains at least 65 weight percent propylene, at least one nucleator and at least one functionalized wax. The inventive adhesives have increased heat resistance and decreased set-time, making them particularly well suited for assembly and packaging applications.

4 Claims, 8 Drawing Sheets

Related U.S. Application Data continuation of application No. 13/836,858, filed on Mar. 15, 2013, now Pat. No. 9,376,597, which is a continuation of application No. PCT/US2011/061587, filed on Nov. 21, 2011.

(60) Provisional application No. 61/415,501, filed on Nov. 19, 2010.

(51) Int. Cl.

| | |
|---|---|
| C09J 123/16 | (2006.01) |
| C08L 91/00 | (2006.01) |
| C09J 7/24 | (2018.01) |
| C09J 7/21 | (2018.01) |
| C09J 7/35 | (2018.01) |
| C09J 123/12 | (2006.01) |
| C08L 23/26 | (2006.01) |

(52) U.S. Cl.
CPC ............ *C09J 7/245* (2018.01); *C09J 7/35* (2018.01); *C09J 123/12* (2013.01); *C09J 123/16* (2013.01); *C09J 123/18* (2013.01); C08L 2023/42 (2013.01); C09J 2423/10 (2013.01); C09J 2451/00 (2013.01); Y10T 428/1303 (2015.01); Y10T 428/1307 (2015.01); Y10T 428/1334 (2015.01); Y10T 428/1352 (2015.01); Y10T 428/2822 (2015.01); Y10T 442/2746 (2015.04)

(56) References Cited

U.S. PATENT DOCUMENTS

| | | | |
|---|---|---|---|
| 5,171,628 | A | 12/1992 | Arvedson et al. |
| 5,201,230 | A | 4/1993 | Sakakibara |
| 5,256,717 | A | 10/1993 | Stauffer et al. |
| 5,331,033 | A | 7/1994 | Stauffer et al. |
| 5,397,843 | A | 3/1995 | Lakshmanan et al. |
| 6,833,404 | B2 | 12/2004 | Quinn et al. |
| 7,256,236 | B1 | 8/2007 | Hacker |
| 2004/0249046 | A1 | 12/2004 | Abhari et al. |
| 2005/0288412 | A1 | 12/2005 | Hohner et al. |
| 2006/0293424 | A1 | 12/2006 | Tse et al. |
| 2007/0281118 | A1* | 12/2007 | Miller ............... C08L 51/06 428/35.7 |
| 2008/0081868 | A1* | 4/2008 | Jiang ............... C08L 91/06 524/487 |
| 2008/0306194 | A1 | 12/2008 | Sun et al. |
| 2009/0110925 | A1* | 4/2009 | Fukuda ............ C09J 123/14 428/355 EN |
| 2009/0203847 | A1 | 8/2009 | Ellis et al. |
| 2010/0038365 | A1 | 2/2010 | Ishida et al. |
| 2010/0059178 | A1 | 3/2010 | Jiang et al. |

FOREIGN PATENT DOCUMENTS

| | | | | |
|---|---|---|---|---|
| EP | 0477662 | A2 | 3/1992 | |
| EP | 0483675 | A2 | 5/1992 | |
| EP | 0489284 | A2 | 6/1992 | |
| JP | 2003518171 | A | 6/2003 | |
| WO | 9709393 | A1 | 3/1997 | |
| WO | WO-0146277 | A2 * | 6/2001 | ........... C09J 123/10 |
| WO | 2010109018 | A1 | 9/2010 | |

OTHER PUBLICATIONS

Wang Jingbo et al., "Crystal structure and morphologies of polypropylene homopolymer and propylene-ethylene random copolymer: Effect of the substituted 1,3,5-benzenetrisamides", Journal of Polymer Science Part B: Polymer Physics, Wiley Periodicals, Inc., vol. 46, 2008, pp. 1067-1078.

Eastotac Hydrocarbon Resins Brochure by the Eastman Company (Aug. 1992).

Specialty Polymers for Adhesives and Sealants by the Exxon Chemical Company (Oct. 1990).

Litz, R.J., Developments in Ethylene-Based Hot Melt Adhesives, Adhesives Age 17(8):35-38 (1974).

Alger, Mark S.M., Polymer Science Dictionary (Elsevier Applied Science, New York 1989), p. 115.

Lee, S.M., Dictionary of Composite Materials Technology (CRC Press, Technology & Engineering 1995), p. 43.

Young, R.J. & Lovell, P.A., Introduction to Polymers (2nd ed., Chapman & Hall, New York 1991), pp. 10-11, 292.

Handbook of Adhesives (ed. Irving Skeist, Van Nostrand Reinhold Co. 1977), pp. 495-498.

Kraus et al., Tack and Viscoelasticity of Block Copolymer Based Adhesives, J. Adhesion 10:221-36 (1979).

Eastman Chemical Brochure titled "World of Eastman Chemicals" dated Jan. 1989, Publication No. P-160F.

Eastman AQ Branched Polyesters Brochure dated Sep. 1997, Publication No. WA-62B.

Eastman Chemical Sales Brochure dated Feb. 1993, Publication No. WA-21.

Exxon Chemical Sales Brochure dated Mar. 1994.

Eastman Chemical Eastotac Hydrocarbon Resins dated Nov. 1994, Publication WA-3C.

Exxon Chemical Escorez Tackifiers Brochure dated Apr. 1992.

Clark, T., Bookbinding with Adhesives (3rd ed. McGraw-Hill, UK 1994), p. 1.

* cited by examiner

ADHESIVE COMPOSITIONS AND USE THEREOF

FIELD OF THE INVENTION

The present invention relates to adhesives that comprise a polymer component, at least one nucleator, and at least one functionalized wax. More particularly the invention relates to adhesives that have increased heat resistance and decreased set-time, making these adhesives particularly well suited for assembly and packaging applications.

BACKGROUND OF THE INVENTION

Adhesives are applied to substrates and are widely used for various commercial and industrial applications, such as product assembly and packaging.

Hot melt adhesives are widely used in the packaging industry to seal cardboard cases, trays and cartons. Some packaging applications require an adhesive to maintain a strong bond to a substrate under extremes of stress and shock in handling, and high temperatures and humidity. Moreover, cases and cartons often encounter very high temperatures during transportation, so adhesives having sufficiently good heat resistance are required in these applications. "Sufficiently good heat resistance" is to be understood to mean that the bonded adhesive maintains fiber tear at elevated temperature, e.g., greater than 52° C. (125° F.), and hence should not immediately soften when acted upon by elevated temperature, with the result that the adhesive bond loosens and/or the bonded parts shift with respect to one another.

Recent developments in polymer technology have allowed for a new generation of propylene with various comonomer based adhesives. However, such adhesives typically have long set-time. For fast throughput, packaging manufacturers desire adhesives with short set-time.

To increase throughput, a nucleator is added to polypropylene-based hot melt adhesive to speed the crystallization time (set-time) in US2005/0288412. However, the drawback to this approach is that the heat resistance of the adhesive can also decrease.

There is a need in the art for a hot melt adhesive that possesses good high heat resistance and fast set-time performances. The current invention fulfills this need.

BRIEF SUMMARY OF THE INVENTION

The invention provides novel adhesives, methods of using the adhesives to bond substrates together, and to articles of manufacture comprising the adhesives.

In one embodiment, the adhesive of the present invention comprises (a) a polymer component which contains in polymerized form at least 65 wt % of propylene, based on the total weight of the polymer component; (b) at least one nucleator; and (c) at least one functionalized wax, wherein the weight ratio of the nucleator to the functionalized wax ranges from about 1:500 to about 50:1. The nucleator can be selected from organic acid salts, phosphoric acids, ethylene-(meth)acrylic acid ionomers, multiple amides components, dibenzylidenesorbitols, sugar alcohols and corresponding derivatives thereof. The functionalized wax can be selected from unsaturated carboxylic acid or anhydride grafted waxes. In a further embodiment, the functionalized wax is a maleic anhydride grafted polypropylene.

Another aspect of the invention is directed to an adhesive comprising (i) at least one polymer component which contains in polymerized form at least 65 wt % propylene, based on the total weight of the polymer component; (ii) at least one nucleator selected from the group consisting of organic acid salts, phosphoric acids, ethylene-(meth)acrylic acid ionomers, multi amides components, sorbitols and their corresponding derivatives thereof; and (iii) at least one functionalized wax which is a wax grafted with at least one olefinically unsaturated dicarboxylic anhydride of less than 12 carbon atoms.

In another aspect, the invention is directed to an adhesive comprising (1) from about 30 to about 99 wt %, based on the total weight of the adhesive, of a polymer component, which contains in polymerized form at least 65 wt % of propylene, based on the total weight of the polymer component; (2) from about 0.05 to about 1 wt %, based on the total weight of the adhesive, of at least one nucleator; and (3) from about 0.01 to about 5.0 wt % based on the total weight of the adhesive, of at least one functionalized wax, wherein the total wt % of the adhesive equals to 100 wt %.

In one embodiment of the present invention the polymer component is a single polymer or a blend of polymers. The polymer component can comprise at least one copolymer of propylene and at least one comonomer selected from ethylene and/or $C_{4-20}$ alpha-olefins, wherein the copolymer preferably contains in polymerized form at least 65 wt %, more preferably at least 80 wt % of propylene and/or preferably contains no more than 35 wt %, more preferably no more than 20 wt % of ethylene and/or $C_{4-20}$ alpha-olefins, each based on the total weight of the copolymer.

In a further aspect, the adhesives of the invention are hot melt adhesives.

In another embodiment, the adhesives of the invention further comprise oils, tackifiers, non-functionalized waxes, plasticizers, and/or stabilizers, and/or mixtures thereof.

Another aspect is directed to a process for forming adhesives with high heat resistance and fast set-time comprising heating a polymer component which contains in polymerized form at least 65 wt % of propylene, based on the total weight of the polymer component, to its molten state; adding at least one nucleator and at least one functionalized wax to the molten polymer component until a homogenous mixture is formed; and cooling the mixture, preferably to room temperature (22° C.). The cooled adhesive can be pelletized or formed into blocks for storage or shipping. The adhesive can be reheated to apply onto substrates.

A further embodiment is directed to applying the adhesive described herein. The adhesive is applied in a molten state onto a substrate; placing another substrate onto the molten adhesive; cooling the adhesive thereby forming a bond of two substrates.

Yet another aspect of the invention is directed to articles of manufacture comprising the adhesives described herein. Articles of manufacture encompassed by the invention include cases, cartons and trays.

DETAILED DESCRIPTION OF THE INVENTION

All documents cited herein are incorporated in their entireties by reference.

The term "polymer component" as used herein, refers to a single (co)polymer or a blend of different (co)polymers, wherein the combined total of all units derived from propylene in all (co)polymers of the polymer component is at least 65 wt %, based on the total weight of the polymer component. The term (co)polymer, as used herein, refers to polypropylene homopolymers or copolymers of propylene and comonomers selected from ethylene and/or $C_{4-20}$ alpha olefins.

The polymer component may comprise a copolymer of propylene and at least one comonomer selected from ethylene or $C_{4-20}$ alpha-olefins. Preferred polymer for the practice of this invention typically comprises units derived from propylene in an amount of at least 65 wt %, preferably at least about 80 wt % and more preferably at least 85 wt % of the copolymer. The typical amount of units derived from ethylene comonomer is preferably at least 1 wt %, more preferably at least 2 wt % and particularly preferably at least 4 wt %, and the maximum amount of units derived from ethylene present in these copolymers is preferably not in excess of 35 wt %, more preferably not in excess of 30 wt % and particularly preferably not in excess of 20 wt % of the copolymer. The amount of units derived from the $C_{4-20}$ alpha-olefins described above, if present, is preferably at least 1 wt %, more preferably at least 2 wt % and particularly preferably at least about 4 wt %, and the typical maximum amount of units derived from $C_{4-20}$ alpha-olefins described above, preferably does not exceed 35 wt %, more preferably it does not exceed 30 wt % and particularly preferably it does not exceed 20 wt % of the copolymer. The combined total of units derived from ethylene and any $C_{4-20}$ alpha-olefin preferably does not exceed 35 wt %, more preferably it does not exceed 30 wt %, and particularly preferably it does not exceed about 20 wt % of the copolymer.

The polymer component may comprise at least one semi-crystalline polypropylene (co)polymer. The term "polypropylene (co)polymer," as used herein, refers to a polypropylene homopolymer or a copolymer, at which contains in polymerized form at least 65 wt % of propylene, based on the total weight of the polypropylene (co)polymer.

The term "semi-crystalline" used for the polypropylene polymer refers to those polymeric materials that contain both crystalline and amorphous regions in the solid state. In the crystalline region, the molecular chains of the polymers are all arranged in ordered three-dimensional arrays whose structure can be fully characterized by their unit cells, the smallest structural unit used to describe a crystal. The amorphous polymers, in contrast, do not have ordered three-dimensional structures in the solid state. Their molecular chains are arranged in a completely random fashion in space. Semi-crystalline polymers can be easily distinguished from completely amorphous polymers by observing the presence or absence of a melting point (Tm) and the associated enthalpy or heat of melting ($\Delta Hm$) derived from the transformation of the crystalline state to liquid state upon heating. All semi-crystalline polymers exhibit a melting point, whereas the melting point is absent for amorphous polymers. Amorphous polymers undergo a transition from a glassy solid to a rubbery elastic state in a narrow temperature range around a glass transition temperature Tg. One should not confuse the glass transition temperature Tg with the melting point Tm. Unlike the melting transition of the crystalline materials, the glass transition of amorphous polymers do not have an enthalpy change ($\Delta H$) associated with it.

It should be understood that semi-crystalline polypropylene polymers defined above are often referred to as crystalline polymers in the trade. Except for the single crystals prepared in the laboratories on a small scale, perfect crystalline polymers are not encountered in the commercial world and all so-called crystalline polymers, strictly speaking, are semi-crystalline. The definition of semi-crystalline polymers set forth herein, therefore, also includes "crystalline polypropylene polymers".

Since semi-crystalline polypropylene polymers contain both crystalline and amorphous regions, in addition to melting transition of crystals, they can exhibit a glass transition associated with the amorphous region of the material. The glass transition takes place at a temperature below the melting point.

The term "semi-crystalline polypropylene polymer" as used in the present invention refers to polypropylene polymers having a heat of melting, as determined by DSC, of at least about 30 J/g, preferably at least about 40 J/g, and more preferably at least about 50 J/g. The term "heat of melting" as used herein, refers to the energy absorbed in converting a material from a crystalline or semi-crystalline state to an amorphous state, and this value can be determined by various analytical methods, including ISO 11357-3. Unless otherwise stated, all reported heat of melting values are determined in accordance with ISO 11357-3, with minor adjustments as indicated in the experimental section.

The semi-crystalline polypropylene polymers of the type described above can be purchased from numerous commercial sources, for example, polypropylene-based semi-crystalline polypropylene polymers, among others, from Lyondell Basell, Ineos, Borealis, TVK and Exxon Mobil.

In one embodiment of the invention, the polymer component is a polymer blend which comprises at least one semi-crystalline polypropylene polymer and at least one elastomeric rubber. Elastomeric rubber, elastomer, and elastomeric polymer are synonymous terms. These materials are either entirely amorphous or of very low crystallinity, preferably with a heat of melting of <30 J/g, more preferably <20 J/g, and most preferably <10 J/g, as determined in accordance with ISO 11357-3. The term "elastomeric rubber" reflects the property of the material that it can undergo a substantial elongation and then returned to its approximately original dimensions upon release of the stress elongating the material. Preferably elastomeric rubber of the present invention will have less than 50%, such as less than 30% or less than 10% permanent set after one minute when recovering from a strain of 100% applied for one minute at a temperature of 22° C. The elastomeric rubber of the present invention can be selected from ethylene-propylene rubbers (EPR) and/or ethylene-propylene diene rubbers (EPDM). The polymer blend also contains in polymerized form at least 65 wt %, more preferably at least 80 wt % of propylene and/or preferably contains in polymerized form no more than 35 wt %, more preferably no more than 20 wt % of ethylene and/or $C_{4-20}$ alpha-olefins. Preferably, each of the polymers in the polymer blend also contains in polymerized form at least 65 wt %, more preferably at least 80 wt % of propylene and/or preferably contains in polymerized no more than 35 wt %, more preferably no more than 20 percent by weight of ethylene and/or $C_{4-20}$ alpha-olefins.

Preferred ethylene-propylene rubber (EPR) of the present invention comprise from 10 to 35 wt % of ethylene and from 65 to 90 wt % of propylene The elastomeric rubber and the semi-crystalline polypropylene (co)polymer can be pre-mixed to form a polymer blend or polymer alloy. The polymer blend can be prepared by mechanical mixing of EPR/EPDM rubber with a semi-crystalline polypropylene polymer through an extruder or Banbury Mixer or the like.

The polymer or the polymer blend component preferably exhibits a heat of melting (Tm) of less than or equal to about 95 J/g. The heat of melting is the quantity of heat needed to melt a unit mass of a solid at a constant temperature, and this is determined Differential Scanning calorimetry (DSC) in accordance with ISO 11357-3.

The polymer or the polymer blend component preferably exhibits a recrystallization temperature of less than about 110° C., preferably less than about 95° C. The recrystallization temperature is the temperature at which random molecular configuration of the melt becomes an ordered, crystalline structure. This temperature can also be determined by a DSC. Depending on the crystallinity of the polymer or the polymer blend, the recrystallization temperature varies.

The polymer blend can also be made in situ by step-wise polymerization in a single or a series of parallel reactors. An example of such in situ reactor process is the Catalloy Process employed by LyondellBasell. This process utilizes multiple gas phase reactors in parallel that allow separate polymerization of different monomer feed stock in each reactor. Each reactor runs independently of the others so each reactor product can be quite dissimilar to what is produced in the other reactors. The product from each reactor can be mixed or blended, creating alloyed polymers directly from the polymerization process. The described multi-stage polymerization process is for example disclosed in the following published references: EP-A-0 472 946, EP-A-0 477 662, EP-A-0 483 675 and EP-A-0 489 284.

An example of polymer blends or alloys produced by the Catalloy Process are thermoplastic olefins (TPOs), which are blends or alloys of EPR and semi-crystalline polypropylene (co)polymers. Blends or alloys produced by the Catalloy Process are commercially available from Lyondell-Basell under the trade name designation Adflex, Softell, and Hifax.

The polymer component of the present invention can also comprise at least one thermomechanical degraded semi-crystalline polypropylene (co)polymer or a blend of at least one thermomechanical degraded semi-crystalline polypropylene polymer and at least one thermomechanical degraded elastomeric rubber. Preferably the polymer component is a thermomechanical degraded blend of at least two polymers where each polymer contains at least 65 wt %, more preferably at least 80 wt % of propylene and/or preferably contains in polymerized form no more than 35 wt %, more preferably no more than 20 wt % of ethylene and/or $C_{4-20}$ alpha-olefins.

In the context of the present invention, the term "thermomechanical degraded semi-crystalline polypropylene polymer" and "thermomechanical degraded elastomeric rubber" is understood to mean a polymer that is manufactured from the corresponding polymer by thermomechanical degradation under shear stress, preferably in an extruder. Here, the weight average molecular weight ($M_w$) of the degraded polymer measured under comparable conditions is always smaller than the weight average molecular weight ($M_w$) of the un-degraded polymer.

In the context of the present invention, the term "thermomechanical degradation" is understood to mean the polymer chain shortening and molecular weight reducing degradation process of a polymer which occurs in an extruder under the action of heat and shear stress. In order to increase the efficiency of the thermomechanical degradation it is particularly advantageous to carry out the thermomechanical degradation in the presence of at least one radical donor and/or in the presence of oxygen.

In the context of the present invention, the term "extruder" can preferably be understood to mean both single-screw as well as twin-screw extruders. The latter is technically more complex and are available in various types. One differentiates between co- and counter-rotating, intermeshing or tangential, longitudinal or transverse, open or closed and cylindrical or conical models. Compounders, expansion extruders or planetary extruders can also be used. Preferably, at least one twin-screw extruder is used for the process according to the invention.

The polymer blend of the present invention preferably comprises polymers, such as semi-crystalline polypropylene (co)polymers, which have a melt viscosity, measured at 200° C., preferably between 300 mPa·s and 1,000,000 mPa·s, particularly preferably between 300 mPa·s and 500,000 mPa·s, more preferably between 300 mPa·s and 250,000 mPa·s and quite particularly preferably between 300 mPa·s and 150,000 mPa·s. The melt viscosity in mPa·s can be measured with a Brookfield Thermosel RVT viscometer (available from Brookfield Engineering Laboratories, Inc., Stoughton, Mass. USA) at the temperature given. For viscosities up to 100,000 mPa·s spindle 27 was used; higher viscosities were measured with spindle 29. The rotational speed of the chosen spindle is preferably adjusted in a way that the torque readings are in the range of 10 to 95%, more preferably about 50%.

The polymer component is present in an amount of from about 30 wt % to about 99 wt %, more preferably from about 50 wt % to about 99 wt %, and even more preferably from about 60 wt % to about 99 wt %, based on the total weight of the adhesive.

It has been discovered that hot melt adhesives with high heat resistance and fast set-time can be prepared by combining at least one nucleator and at least one functionalized wax in an adhesive, comprising a polymer component. The nucleator and the functionalized wax in the adhesive work together to produce results not obtained by them independently. This synergistic effect allows for higher heat resistance and fast set time of the adhesive. The adhesives of the present invention also comprise at least one nucleator component. It is common in the art to use the terminology "nucleator" to include nucleating agents or clarifying agents. Nucleator, when incorporated in a polymer, forms nuclei for crystal growth, also known as spherulites, in the polymer melt. Spherulites are rounded aggregate of crystal structures with spherule textures, occurred by growing of lamellae with specific arrangement from crystal nucleus, and are observed by optical microscopy and cross polarized light. Nucleators have typically been used to increase the processing speed in injection molding and extrusion process. Description and suitable examples of nucleators are found in *Nucleating Agents by Stuart Fairgrieve*, Woodhead Publishing Limited, November 2007.

Suitable nucleators are, for example, salts of organic acids, such as aliphatic monocarboxylic or dicarboxylic acids, examples being alkali metal, alkaline earth metal or aluminum salts of succinic acid, glutaric acid, caproic acid, montanic acid or corresponding salts of carboxylic acids containing aromatic groups, such as benzoic, alkylbenzoic, naphthoic, phenylacetic or cinnamic acid. Also suitable are adjuvants based on phosphoric acid, examples being alkali metal organophosphates. Also effective are ethylene-(meth) acrylic acid ionomers, examples being corresponding commercial products such as the grades from the Aclyn® range (commercial products from Honeywell) or from the Surlyn® range (commercial products from Dupont). Multiple amides components and their derivatives are also suitable as nucleators. Multiple amides components are compounds which have at least two amide functionalities on an aromatic or aliphatic core groups. Examples include aromatic tris amide derivatives such as 1,3,5-benzenetrisamide, N,N,N-tris-tert-butyl-1,3,5-benzenetricarboxamide, N,N,N-tris-cyclohexyl-1,3,5-benzenetricarboxamide, N,N,N-n-butyl-1,3,5-benzene-tricarboxamide, N,N,N-tris-isopropyl-1,3,5-benzenetricarboxamide, and the like, which are described in Frank Abraham et. al., Synthesis and Structure—Efficiency Relations of 1,3,5-Benzenetrisamides as Nucleating Agents and Clarifiers for Isotactic Poly(propylene), Macromol. Chem. Phys. 2010, 211, 171-181 and JINGBO WANG, et. al., Crystal Structure and in Morphologies of Polypropylene Homopolymer and Propylene-Ethylene Random Copolymer: Effect of the Substituted 1,3,5-Benzenetrisamides, Journal of Polymer Science: Part B: Polymer Physics, Vol. 46, 1067-1078 (2008). Aromatic tris amides are also commercially avalible as Irgaclear XT 386 and NJSTAR NU-100 (N,N'-dicyclohexyl-2,6-naphthalenendicarboxamide). Multiple amides components also includes aliphatic tris amides derivatives such as N,N',N''-tris(2-methylcyclohexyl)-1,2,3-propanetricarboxamide, available as RiKA-CLEAR PC1, and the like. Likewise, suitable are dibenzylidenesorbitol type, not only in the unsubstituted form but also in the singly or multiply alkyl-substituted form, methyl-substituted for example. Another suitable class of nucleators includes sugars or sugar alcohols of allose, altrose, fructose, galactose, glucose, gulose, idose, mannose, sorbose, talose, tagatose, arabinose, ribose, ribulose, xylose, xylulose, lyxose, erythrose, threose sorbitol, and xylitol. In a preferred embodiment, the nucleator is a clarifying agent. A Clarifying agent is typically an organic, non-polymeric molecule that increases the polymer transparency by reducing the size of the polymer spherulites. Suitable clarifying agents include sorbitol derivatives, for example, 1,3: 2, 4 dibenzylidene sorbitol, 1,2,3,4-di-para-methylbenzylidene sorbitol, 1,2,3, 4-di-meta, para-methylbenzylidene sorbitol, bis(4-propyl-benzylidene) propyl sorbitol and mixtures thereof. The aforementioned clarifying agents are commercially available from Milliken Chemical under the trade names Millad and Hyperform HPN series.

Preferably, the nucleator or a mixture of different nucleator is present from about 0.01 wt % to less than about 3 wt %, preferably less than about 1 wt %, based on the total weight of the adhesive.

The adhesive further comprises a functionalized wax or a mixture of functionalized waxes.

The term "wax" means a polymeric material that has a heat of melting greater than 50 J/g. Generally, heat of melting of the wax component is higher than the heat of melting of the polymer or polymer blend component. While some waxes and some polymers (and polymer blends) have overlapping heat of melting values, the wax, for this purpose of this invention, has a higher heat of melting value than the polymer or the polymer blend, as defined above. Typically, the difference between the wax and the polymer or polymer blend is greater than about 10 J/g, preferably greater than about 15 J/g. Also, the wax component has a recrystallization temperature greater than about 95° C., preferably greater than about 100° C. Recrystallization temperature, as used herein, refers to the temperature of maximum heat evolution from the sample as it is cooled at a controlled rate, and this value can be determined by various analytical methods, including ISO 11357-3. Unless otherwise noted, all recrystallization temperature values are determined in accordance with ISO 11357-3, with minor adjustments as indicated in the experimental section. Again, while some waxes and some polymers (and polymer blends) have overlapping recrystallization temperature, the wax, for this purpose of this invention, has a recrystallization temperature that is greater than the polymer or the polymer blend.

The term "functionalized wax" refers to a wax which comprises at least one functional group that has been grafted onto, copolymerized or oxidized in an amount of at least 0.01 wt %, preferably of at least 0.1 wt %, and more preferably of at least 0.5 wt %, and up to 5 wt %, each based on the total amount of the functionalized wax.

In one embodiment, the wax is grafted with an unsaturated carboxylic acid or its anhydride. Representative examples of suitable waxes include homopolymers and copolymers of various olefins such as ethylene, propylene, butylene, pentene, hexylene, heptene and octene. Suitable monomers for grafting onto the aforementioned polyolefin are, for example, olefinically unsaturated monocarboxylic acids of less than 12 carbon atoms, e.g., acrylic acid or methacrylic acid, and the corresponding tert-butyl esters, e.g., tert-butyl(meth)acrylate, olefinically unsaturated dicarboxylic acids of less than 12 carbon atoms, e.g., crotonic acid, fumaric acid, maleic acid, and itaconic acid and the corresponding mono- and/or di-tert-butyl esters, e.g., mono- or di-tert-butyl crotonate, mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth)acrylamide-2-methylpropenesulfonic acid or 2sulfonyl(meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl(meth) acrylate or allyl glycidyl ether. The acid number of the grafted wax is present from about 5 to about 200 mg KOH/g, preferably from about 10 to about 100 mg/KOH, measured in accordance with ASTM D-1386.

In one exemplary embodiment, the functionalized wax used in the practice of the invention is a maleic anhydride grafted on a polypropylene wax. A variety of maleic anhydride grafted wax suitable for use herein are available commercially and/or are obtainable using known procedures. For example, maleated polyethylenes are available from Honeywell under the trade names A-C 575 and A-C 573, and from DuPont as products listed as part of their Fusabond E series. Maleated polypropylenes are available from Honeywell under the trade names A-C 597A, A-C 597P, A-C 907P, A-C 596A, A-C 596P, A-C 950P and A-C 1325P, from DuPont as products listed under the Fusabond P trade named series, from Eastman under the trade names G-3015, G-3003, and from Westlake under the trade name EPOLENE E-43. Any known procedures for producing maleated polyolefins from precursor compounds can be adapted for use to make starting materials suitable for use herein. For example, U.S. Pat. No. 7,256,236, incorporated herein by reference, discloses certain preferred methods for producing maleated polypropylenes suitable for use herein.

In another embodiment, the functionalized wax is a wax that has been copolymerized with a functional group. Representative examples of suitable copolymerizes waxes include terpolymer of ethylene-acrylic ester-maleic anhydride and ethylene-acrylic ester-glycidyl methacrylate, available as Lotader® MAH and Lotader® GMA, respectively.

In a further embodiment, the functionalized wax is an oxidized polyethylene homopolymers, including high density oxidized polyethylene homopolymers. Exemplary oxidized polyethylenes are available from Honeywell under the trade names A-C 673P, A-C 680, A-C 655, A-C 629, A-C 629A, A-C 656, A-C 6702, A-C 307, A-C 307A, A-C 316, A-C316A, A-C 325, A-C 392, A-C 330, A-C 395 and A-C 395A.

The functionalized wax may be present from about 0.1 wt % to about 15 wt %, preferably from about 1 wt % to about 5 wt %, based on the total weight of the adhesive. Preferably the functionalized wax is a propylene functionalized with maleic anhydride wherein the acid number of the grafted wax is present from about 5 to about 200 mg KOH/g, preferably from about 10 to about 100 mg KOH/g, measured in accordance with ASTM D-1386.

While not bound by any particular theory, it is believed that the combined effect of the nucleator and the functionalized wax results in a synergy of producing a multitude of spherulites with a large total surface area. The increased surface area increases the energy required to disrupt the structure and integrity of the hot melt adhesive, thus, the performance of the heat resistance increases.

The ratio of the nucleator and the functionalized wax in an adhesive composition should be in the ratio of about 1:500 to about 50:1, preferably, from about 1:100 to about 10:1, and more preferably from about 1:40 to about 2:1. Adhesive compositions with ratio of nucleator and functionalized wax outside this range results in poor performance, e.g., poor heat resistance and poor set time.

The adhesives of the invention may optionally comprise tackifiers, non-functionalized waxes, plasticizers, stabilizers, additives or mixtures thereof.

The tackifier component may typically be present up to about 60 wt %, more preferably up to about 50 wt %, even more preferably up to about 40 wt %, based on the total weight of the adhesive.

Typical tackifier has a Ring and Ball softening points, as determined by ASTM method E28, of about 70° C. to about 150° C., more preferably of about 95° C. to about 130° C.

Useful tackifying resins may include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Examples of hydrogenated tackifiers particularly suitable include Escorez 5406 from Exxon Mobil Chemicals, Arkon P100 from Arakawa and Regalite S1100 from Eastman Chemical, and the like. Also included are the cyclic or acyclic C5 resins and aromatic modified acyclic or cyclic resins. Examples of commercially available rosins and rosin derivatives that could be used to practice the invention include SYLVALITE RE 110L, SYLVARES RE 115, and SYLVARES RE 104 available from Arizona Chemical; Dertocal 140 from DRT; Limed Rosin No. 1, GB-120, and Pencel C from Arakawa Chemical. Examples of commercially available phenolic modified terpene resins are Sylvares TP 2040 HM and Sylvares TP 300, both available from Arizona Chemical.

Preferred tackifiers are synthetic hydrocarbon resins. Included are aliphatic or cycloaliphatic hydrocarbons, aromatic hydrocarbons, aromatically modified aliphatic or cycloaliphatic hydrocarbons and mixtures thereof.

Non-limiting examples include aliphatic olefin derived resins such as those available from Goodyear under the Wingtack® Extra trade name and the Escorez® 1300 series from Exxon. A common $C_5$ tackifying resin in this class is a diene-olefin copolymer of piperylene and 2-methyl-2-butene having a softening point of about 95° C. This resin is available commercially under the trade name Wingtack 95. Eastotac series from Eastman are also useful in the invention.

Also useful are aromatic hydrocarbon resins that are $C_9$ aromatic/aliphatic olefin-derived and available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-105° C. and is commercially available from Cray Valley.

Alpha methyl styrene such as Kristalex 3085 and 3100 from Eastman Chemicals, Sylvares SA 100 from Arizona chemicals are also useful as tackifiers in the invention. Adhesives formulated with such alpha methyl styrenes have resultant viscosity of less than about 1500 mPa·s at 121° C. Mixtures of two or more described tackifying resins may be required for some formulations.

Small quantities of alkyl phenolic tackifiers can be blended with additional tackifier agents detailed above to improve the high temperature performance of these adhesives. Alkyl phenolics added in less than 20 wt % of the total weight of the adhesive are compatible and in the proper combination increase high temperature adhesive performance. Alkyl phenolics are commercially available from Arakawa Chemical under the Tamanol trade name and in several product lines from Schenectady International.

The adhesive of the invention may optionally comprise a non-functionalized wax. Non-functional waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes.

Paraffin waxes that can be used in the practice of the invention include Pacemaker® 30, 32, 35, 37, 40, 42, 45 & 53 available from Citgo Petroleum, Co.; Astor Okerin® 236 available from Honeywell; R-7152 Paraffin Wax available from Moore & Munger; R-2540 available from Moore and Munger; and other paraffinic waxes such as those available from Sasol Wax under the product designations Sasolwax 5603, 6203 and 6805

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Baker Petrolite Corp.; Bareco® ES-796 Amber Wax, a 70° C. melt point wax available from Bareco; Besquaree 175 and 195 Amber Waxes and 80° C. and 90° C. melt point microcrystalline waxes both available from Baker Petrolite Corp.; Indramic® 91, a 90° C. melt point wax available from Industrial Raw Materials; and Petrowax® 9508 Light, a 90° C. melt point wax available from Petrowax. Other examples of microcrystalline waxes are Sasolwax 3971 available from Sasol Wax and Microwax K4001 available from Alfred Kochem GmBH.

Exemplary high density low molecular weight polyethylene waxes falling within this category include ethylene homopolymers available from Backer Petrolite Corp. as Polywax™ 500, Polywax™ 1500 and Polywax™ 2000. Polywax™2000 has a molecular weight of approximately 2000, an Mw/Mn of approximately 1.0, a density at 16° C. of about 0.97 g/cm$^3$, and a melting point of approximately 126° C.

When used, the non-functionalized wax component will typically be present in amounts of up to about 45 wt %. Formulation comprising a wax component will more typically comprise from about 5 to about 40 wt %. Preferred waxes have a melt temperature between 49° C. and 121° C., more preferably between 66° C. and 110° C., and most preferable between 82° C. and 104° C.

The adhesives of the present invention may desirably also contain a plasticizer, including oil. Suitable plasticizers include polybutenes, phthalates, benzoates, adipic esters and the like. Particularly preferred plasticizers include phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils and derivatives. Preferred plasticizers include paraffinic oil, naphthenic oil, aromatic oil, long chain partial ether ester, alkyl monoesters, epoxidized oils, dialkyl diesters, aromatic diesters, alkyl ether monoester and mixtures thereof.

In one embodiment, the oil is typically present at about 1 to about 30 wt %, more preferably 5 to 20 wt %, based on the total weight of the adhesive. In some embodiments, however, oils may not be desired and is present at less than 5 wt %, preferably less than 3 wt %, more preferably less than 1 wt %, more preferably less than 0.5 wt % or even essentially free of oil, based upon the total weight of the adhesive.

The adhesives of the present invention may desirably also contain at least one stabilizer and/or at least one antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include Irganox® 565, 1010, 1076 and 1726 which are hindered phenols. These are primary antioxidants which act as radical scavengers and may be used alone or in combination with other antioxidants such as phosphite antioxidants like Irgafos® 168 available from Ciba Specialty Chemicals. Phosphite catalysts are considered secondary catalysts and are not generally used alone. These are primarily used as peroxide decomposers. Other available catalysts are Cyanox® LTDP available from Cytec Industries and Ethanox® 330 available from Albemarle Corp. Many such antioxidants are available either to be used alone or in combination with other such antioxidants. These compounds are added to the hot melts in small amounts, typically less than about 10 wt %, and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as pigments, dyestuffs and fillers conventionally added to hot melt adhesives may be incorporated in minor amounts, i.e., up to about 10% by weight, into the formulations of the present invention.

In one embodiment of the invention, a method of increasing the heat resistance of a hot melt adhesive composition is provided. The method comprises adding at least one nucleator and at least one functionalized wax in a polymer component, preferably comprising at least one crystalline or semi-crystalline polypropylene (co)polymer to increase the heat resistance of the composition. The method of the invention can be used to increase the heat resistance of a hot melt adhesive formulation at least by 5° C. or more. Formulations showing an increase in heat resistance of least 5° C., at least 10° C., more preferably at least 15° C. or more can be achieved in accordance with the practice of the invention. The adhesives may desirably be formulated for conventional and low temperatures application, i.e., formulations that can be applied at temperatures at about 177° C. (350° F.) and down to about 93° C. (200° F.). They provide superior adhesive bonds even when exposed to a wide variety of temperature conditions. The adhesives possess excellent heat resistance and fast set-time.

The adhesive compositions of the present invention are prepared by blending the components in a melt at a temperature above about 180° C. to form a homogeneous blend. Various methods of blending are known in the art and any method that produces a homogeneous blend, including extrusion process, is satisfactory. The blend is then cooled and may be formed into pellets or blocks for storage or shipping. These pre-formed adhesives can then be reheated to apply onto substrates.

In one embodiment of the present invention the adhesive comprises
- (a) from about 30 to about 99 wt % of at least one polymer component which contains in polymerized form of at least 65 wt % propylene, based on the total weight of the polymer component;
- (b) from about 0.01 to about 3 wt %, based on the weight of the adhesive, of at least one nucleator;
- (c) from about 0.1 to about 15 wt %, based on the weight of the adhesive, at least one functionalized wax;
- (d) from 0 to about 60 wt %, based on the weight of the adhesive, of at least one tackifier; and
- (e) from 0 to about 5 wt %, based on the weight of the adhesive, of at least one antioxidant;

wherein the weight ratio of the nucleator to the functionalized wax ranges from about 1:500 to about 50:1.

In another embodiment of the present invention the adhesive comprises
- (i) from about 30 to about 99 wt % of at least one polymer component which contains in polymerized form of at least 65 wt % of propylene, based on the total weight of the polymer component;
- (ii) from about 0.01 to about 3 wt %, based on the weight of the adhesive, of at least one nucleator selected form the group consisting of organic acid salts, phosphoric acids, ethylene-(meth)acrylic acid ionomers, multiple amides components, sorbitols and their corresponding derivatives thereof; and
- (iii) from about 0.1 to about 15 wt %, based on the weight of the adhesive, of at least one functionalized wax which is a wax grafted with at least one olefinically unsaturated dicarboxylic anhydride of less than 12 carbon atoms;
- (iv) from 0 to about 60 wt % of at least one tackifier; and
- (v) from 0 to about 5 wt % of at least one antioxidant.

Yet in another embodiment of the invention, the adhesive comprise
- (1) from about 30 to about 99 wt % of a polymer component which contains in polymerized form of at least 65 wt % of propylene, based on the total weight of the polymer component;
- (2) from about 0.05 to about 1 wt %, based on the weight of the adhesive, of at least one nucleator; and
- (3) from about 0.01 to about 5 wt %, based on the weight of the adhesive, of at least one functionalized wax;

wherein the total weight percent of the adhesive equals to 100 weight percent.

In another embodiment of the invention, a method for bonding a substrate to a similar or dissimilar substrate is provided. The method comprises applying to at least a first substrate a molten adhesive of the present invention, bringing a second substrate in contact with the adhesive applied to the first substrate, and allowing the composition to solidify, thereby the first and second substrates are bonded together, wherein the adhesive of the present invention preferably comprises at least one crystalline or semi-crystalline (co)polymer, at least one nucleator and at least one functionalized wax.

The substrates to be bonded include virgin and recycled kraft, high and low density kraft, chipboard and various types of treated and coated kraft and chipboard. Composite materials are also used for packaging applications. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials, find utility in the packaging industry.

The hot melt adhesives of the invention find use in, for example, packaging, converting, bag ending and in nonwovens articles. The adhesives find particular use as case, carton, and tray forming adhesives, and as sealing adhesives, including heat sealing applications, for example in the packaging of cereals, cracker and beer products. Encompassed by the invention are containers, e.g., cartons, cases, boxes, bags, trays, filters, bookbinding and the like, wherein the adhesive is applied by the manufacturer thereof prior to shipment to the packager. Following packaging, the container is heat sealed.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLE

Heat stress is defined as being the temperature at which a stressed bond fails. In the examples that follow, heat stress, or the ability of a hot melt to withstand elevated temperature under cleavage forces (also referred to herein as cleavage heat stress), was used to measure heat resistance.

Heat resistance values were measured as described in US 2009/0203847.

Figure 1:
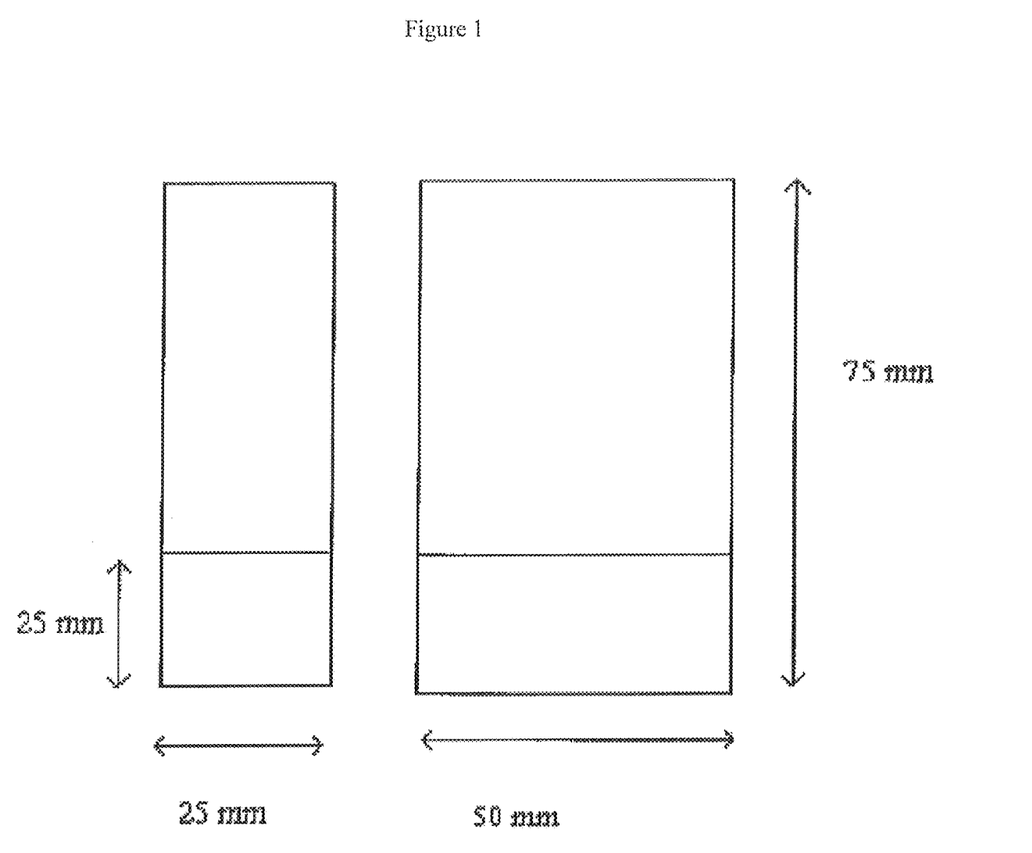
FIGS. 1-3 are diagrams illustrating placement of the adhesive bead and other dimensional parameters used to measure the heat resistance of an adhesive bond.

1. Four pieces of board 75 mm×25 mm and 75 mm×50 mm were cut from corrugated board with the fluting running parallel to the longest edge. On both sides of each board a line was drawn 22 mm from the end as indicated in FIG. 1.

2. Approximately 100 g of hot melt in a small metal container was heated at the application temperature, 180-185° C.

3. The adhesive was stirred with a spatula to ensure even heat distribution; the spatula was then lifted out of the adhesive to produce a stream of adhesive in the container. This process was repeated for each sample.

4. The 50 mm board was passed under the stream of adhesive to give a bead width of 3 mm along the 25 mm line as shown in FIG. 1 (the speed with which the board moved determined the bead width and the typical speed was about 2 m/sec).

Figure 2:
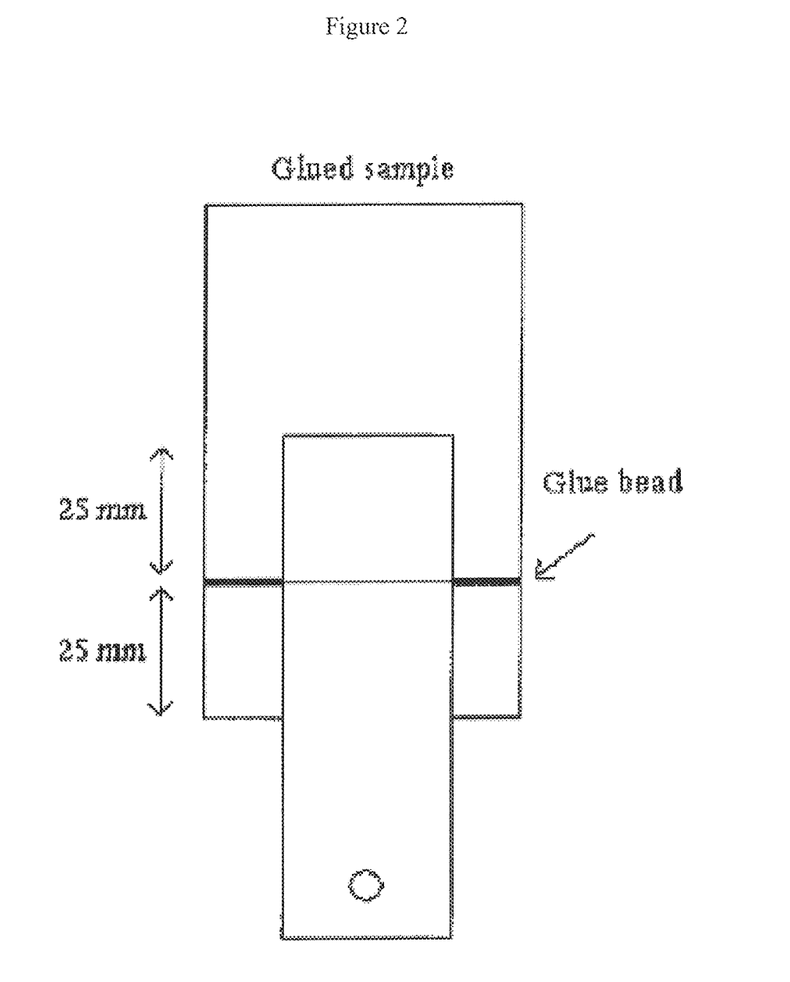

5. The 25 mm board was taken and bonded same side to same side lining up 25 mm mark to that of 50 mm board's 25 mm mark as shown in FIG. 2. The 25 mm board was positioned in the center of the 50 mm board leaving uncompressed hot melt adhesive on either side, this uncompressed adhesive once cooled can be used to check that the bead width is ±3 mm.

6. The bond was formed within 3 seconds and a 100 g weight placed on the bond area to ensure even bonding pressure. The bond was left at least 24 hours before testing.

Figure 3:
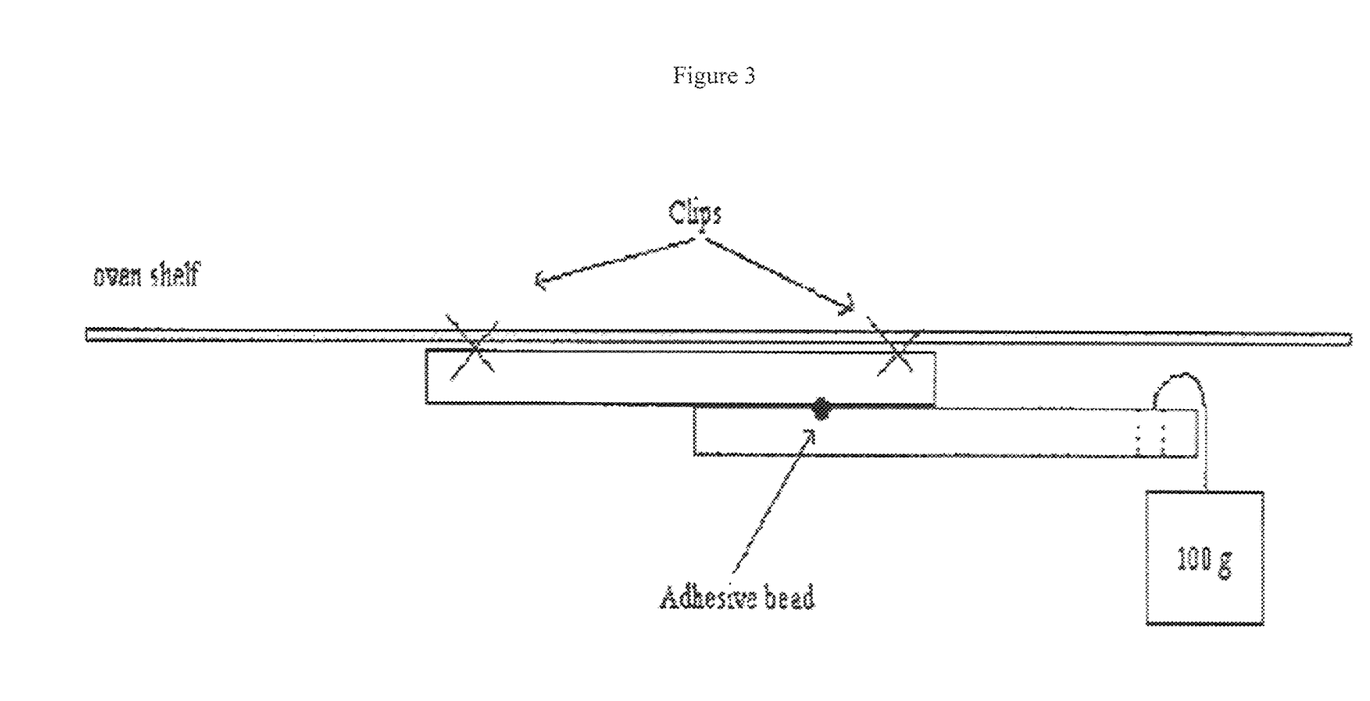
Figure 4:
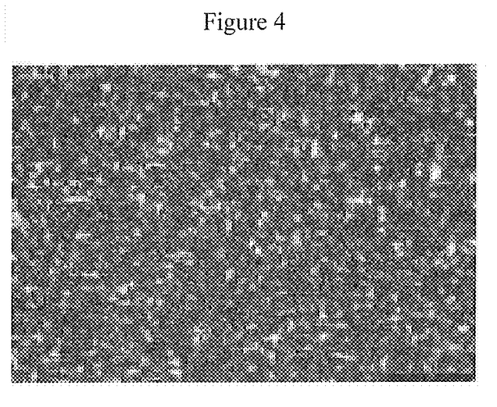
FIGS. 4-7 are microscopic photographs of spherulites in adhesive formulations with 1000× magnification and cross-polarized light.
Figure 5:
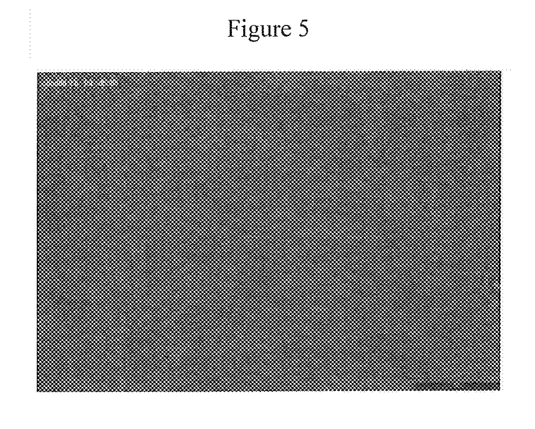
Figure 6:
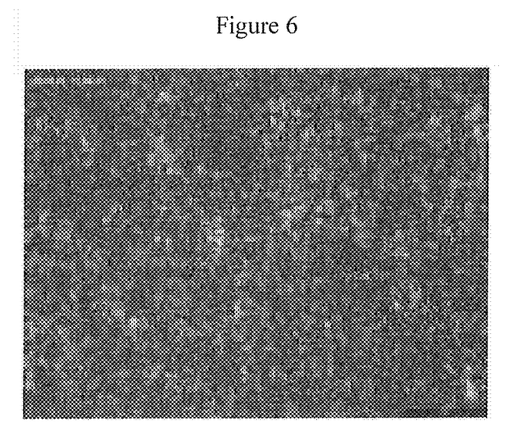

7. The 25 mm board end of the bonded sample was hole-punched to allow a 100 g weight to be hung from it. The sample was attached by the 50 mm piece of board in an oven so that it was horizontal to the oven shelf with the 25 mm board facing down using four bulldog clips and a 100 weight was attached to it as shown FIG. 3.

8. The oven was turned on and set at a temperature of 40° C. and left for 20 minutes. The oven temperature after the initial 20 minutes was raised by 3° C. every 15 minutes. The oven temperature noted when the sample fails represents the heat resistance of the sample. The reported heat resistance value is an average value, based on 4 tests.

Set-time is defined as the amount of time the substrates must be compressed together before they can be released. A bond held shorter than the set time may open up or be of inadequate strength. A bond held for the required set time or longer will deliver full adhesive properties. The set-time was measured using the method as described in U.S. Pat. No. 5,201,230. A bead of adhesive was applied to a cardboard substrate traveling on a belt moving at 30 m/s. The application temperature of the adhesive was 180° C. After an open time of 1 second, another cardboard substrate was applied to the first substrate with a force of 1 kg. The two substrates were held together for a predetermined time, known as "set-time," and then separated with maximum force. The set-time is defined as the amount of time required to hold the two substrates together before achieving a 100% fibre tear along the bead of adhesive when the substrates are separated. The reported set-time value is an average value, based on 3 tests.

Polymer 1 was formed by degrading a single polymer that contained greater than 75 wt % propene content until it reached a viscosity of 1,868 mPa·s at 200° C.

The polymers blends were formed by thermal mechanical degradation of two olefinic polymers: (i) an ethylene-propylene rubber (EPR) and (ii) a semi-crystalline olefinic polymer which has less than 20 wt % ethylene or $C_{4\text{-}20}$ alpha olefin comonomers. All of the polymer blends contained at least 65 wt % polypropylenes and less than 20 wt % ethylene or $C_{4\text{-}20}$ alpha olefin comonomers. Each polymer blend was thermal mechanically degraded until it reached the following viscosity at 200° C. The viscosities of the polymers were measured with Brookfield Thermosell RVT viscometer, with spindle 27.

The heat of melting and the recrystallization temperature are reported below for Polymer 1 and Polymer Blend E. The heat of melting and recrystallization temperature values were measured with a DSC (Q2000 from TA Instruments) in accordance with ISO 11357-3, with minor adjustments: the cooling and the second heating run rates were reduced from −10° K/min to −5° K/min and the time the sample was held at the lowest temperature, directly following the cooling run, was increased from 5 minutes to 15 minutes. For sample preparation, 3-10 mg of the polymer/polymer blend was weighed in an aluminum standard crucible with a lid. The sample was then loaded in the DSC and cooled to −90° C. to be equilibrated at that temperature for 20 minutes, then heated from −90° C. to 200° C. with a heating rate of 10° K/min (first heating run), equilibrated at 200° C. for 5 minutes, followed by cooling down to −90° C. with a cooling rate of 5° K/min (cooling run), equilibrated at −90° C. for 15 minutes and then followed by a heating step to 200° C. with a heating rate of 5° K/min (second heating run). The recrystallization temperature was calculated from the cooling run and the heat of melting was obtained from the second heating run, both values were determined in accordance with ISO 11357-3. The viscosities (at 190° C.), heats of melting and recrystallization temperatures of the functionalized waxes (Epolene E43 and A-C-596P) were also measured as described above.

Figure 8:
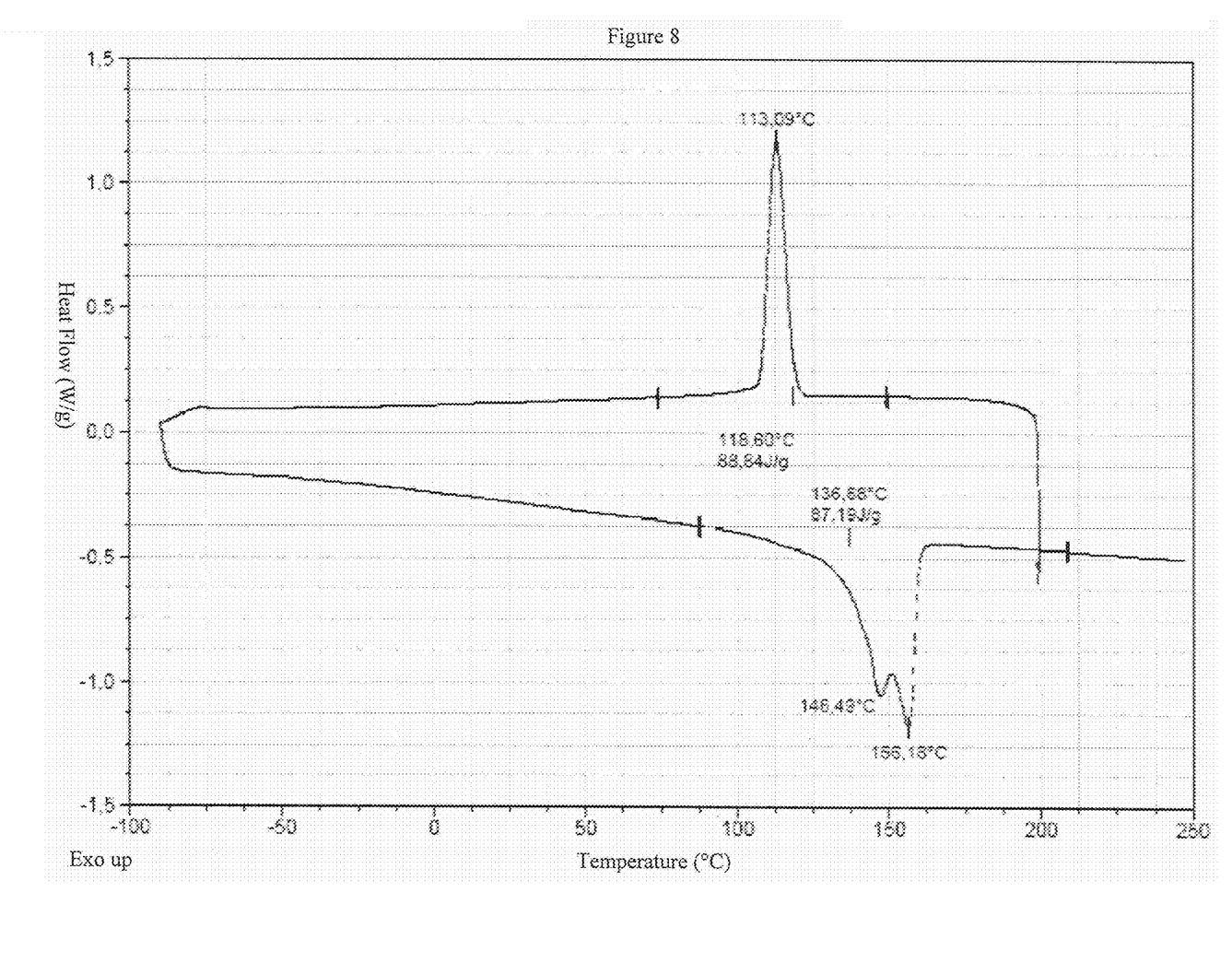
FIG. 8 is a DSC curve of Epolene E43.

FIG. 8 is a DSC curve that shows the measurements and integrations of the heat of melting and recrystallization temperature for Epolene E43.

| Polymer/Polymer Blend | Melt viscosity at 200° C. (mPa · s) | Heat of Melting (J/g) | Recrystallization Temperature (° C.) |
|---|---|---|---|
| Polymer 1 | 1,868 | 69 | 99.2 |
| Polymer Blend A | 2,400 | | |
| Polymer Blend B | 2,000 | | |
| Polymer Blend C | 1,900 | | |
| Polymer Blend D | 3,700 | | |
| Polymer Blend E | 1,700 | 50 | 92 |
| Functionalized Wax | Melt viscosity at 190° C. (mPa · s) | | |
| Epolene E43 (Westlake Chemical) | 400 | 87 | 113 |
| A-C-596P (Honeywell) | 400 | 70 | 102 |

Components to Reference and Sample Adhesives made with Polymer 1 are listed in Table 1. All of the components were heated at 180° C. until they were dissolved into a homogenous mixture.

TABLE 1

Adhesive Formulation with a Single Polymer

| | Reference 1 (wt %) | Reference 2 (wt %) | Reference 3 (wt %) | Sample 4 (wt %) |
|---|---|---|---|---|
| Polymer 1 | 80 | 80 | 80 | 80 |
| Arkon M-100 (Arakawa Europe) | 20 | 20 | 20 | 20 |
| Epolene E43 | — | 1 | — | 1 |
| Millad NX 8000 (Milikan Chemical) | — | — | 0.2 | 0.2 |
| Irganox 1010 (BASF) | 0.3 | 0.3 | 0.3 | 0.3 |
| Heat resistance (° C.) | 87 | 93 | 81 | 99 |
| Set time (seconds) | 9-10 | 9 | 2.5 | 2-2.5 |

As shown in Table 1, the addition of a functionalized wax in the formulation (Ref2) increased the heat resistance, but the set time remained high. The addition of a nucleator (Ref 3) decreased the set time of the formulation, but the heat resistance suffered. Only when both the functionalized wax and the nucleator are present in the adhesive did the heat resistance and the set time improve. In fact, the addition of both components significantly improved the heat resistance and the set speed, and the result produced an effect greater than the sum of their individual component effects.

Components to each adhesive made with Polymer Blend A are listed in Table 2. All of the components were heated at 180° C. until they were dissolved into a homogenous mixture.

TABLE 2

Adhesive Formulation with a Polymer Blend

| | Reference A (wt %) | Reference B (wt %) | Reference C (wt %) | Sample D (wt %) |
|---|---|---|---|---|
| Polymer Blend A | 63.75 | 63.67 | 63.18 | 63.09 |
| Escorez 5400 (Exxon Mobil Chemical) | 26.41 | 26.38 | 26.17 | 26.14 |
| Epolene E43 | — | — | 0.90 | 0.90 |

TABLE 2-continued

Adhesive Formulation with a Polymer Blend

|  | Reference A (wt %) | Reference B (wt %) | Reference C (wt %) | Sample D (wt %) |
|---|---|---|---|---|
| Millad NX 8000 | — | 0.14 | — | 0.14 |
| Edelex S 946 Oil (Shell Chemical) | 9.11 | 9.10 | 9.03 | 9.01 |
| Irganox 1010 | 0.73 | 0.71 | 0.72 | 0.72 |
| Heat resistance (° C.) | 51 | 47 | 63 | 73 |
| Set time (seconds) | 20 | 3 | 19 | 3 |

Adhesives listed in Table 3 were made in the same manner as the adhesive in Table 2.

TABLE 3

Spherulites

|  | Reference E (wt %) | Reference F (wt %) | Reference G (wt %) | Sample H (wt %) |
|---|---|---|---|---|
| Polymer Blend B | 69.44 | 68.76 | 69.31 | 68.63 |
| Escorez 5400 | 29.76 | 29.47 | 29.70 | 29.41 |
| Epolene E43 | — | 0.98 | — | 0.98 |
| Millad NX 8000 | — | — | 0.20 | 0.20 |
| Irganox 1010 | 0.80 | 0.79 | 0.79 | 0.78 |
| FIG. | 4 | 5 | 6 | 7 |

FIGS. 4-7 are microscopic photographs of spherulites of adhesives of Table 3. Each adhesive was (1) placed onto a microscope slide and melted at 180° C., (2) a cover slip was applied onto the adhesive, (3) the entire slide was cooled to room temperature, and (4) a photograph of the slide, with a polarized light and 1000× magnification, was taken.

Figure 7:
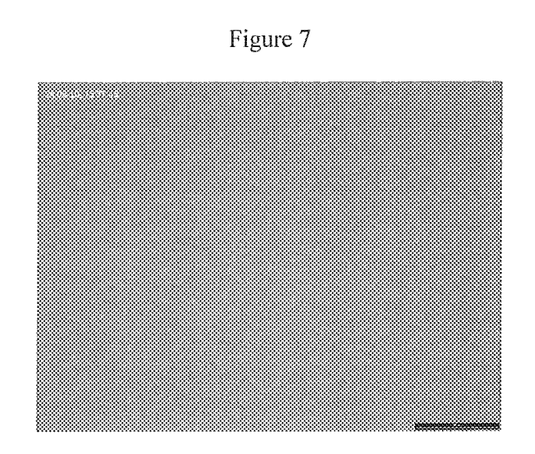

While the presence of a nucleator or a functionalized wax, alone, decreased the size of the spherulites (compare FIGS. 5 and 6 to FIG. 4), the addition of both components drastically decreased the size of the spherulites (FIG. 7). It is this synergistic effect of both a nucleator and a functionalized wax that resulted in the significant improvement in heat resistance and set time of the adhesive.

The range of ratio of the nucleator to the functionalized wax was tested and reported in Table 4. The adhesives in Table 4 were prepared in the same manner as the adhesives in Tables 2 and 3.

TABLE 4

Nucleator: Functionalized Wax Ratio

|  | Reference I (wt %) | Reference J (wt %) | Reference K (wt %) | Sample L (wt %) |
|---|---|---|---|---|
| Nucleator: Functionalized wax (ratio) | N/A | 1:567 | 99:1 | 1:5 |
| Polymer Blend C | 70.14 | 66.16 | 69.44 | 69.31 |
| Escorez 5400 | 29.06 | 27.41 | 28.77 | 28.71 |
| Epolene E43 | — | 5.67 | 0.01 | 0.99 |
| Millad NX 8000 | — | 0.01 | 0.99 | 0.20 |
| Irganox 1010 | 0.80 | 0.76 | 0.79 | 0.79 |
| Set Time (sec) | 15.0-17.5 | 15.0-17.5 | 3.0 | 2.0-2.5 |
| Heat resistance (° C.) | 63.3 | 64.0 | 57.3 | 83.0 |

As shown in Table 4, the ratio of the nucleator to a functionalized wax affects the performance of the adhesive. Adhesives with the nucleator and the functionalized wax ratio within the preferred range, 1:500 to 10:1 (nucleator to functionalized wax), results in short set-time and high heat resistant performance.

Multiple amides components and its derivatives as nucleators were also tested. The Samples were prepared in the same manner described in Tables 1-4.

TABLE 5

Multiple Amides Components as Nucleators

|  | Sample M (wt %) | Sample N (wt %) |
|---|---|---|
| Polymer | Polymer Blend D 79.59 | Polymer Blend E 69.34 |
| Tackifier | Escorez 5380 (Exxon Mobil Chemical) 18.90 | Escorez 5400 27.73 |
| Functionalized Wax | A-C-596P 0.99 | Epolene E43 1.98 |
| Nucleator | Irgaclear XT386 (Milikan Chemical) 0.02 | RiKACLEAR PC1 (Rika International) 0.148 |
| Anti-oxidant | Irganox B225 (BASF) 0.50 | Irganox 1010 0.79 |
| Heat resistance (° C.) | 75 | 72.3 |
| Set time (seconds) | 6-7 | 6-7 |

The use of multiple amides as nucleators with functionalized wax also resulted in adhesives with short set-time and high heat resistance.

We claim:

1. A process for forming an adhesive comprising:
   (a) thermomechanically degrading ethylene-propylene rubber and/or ethylene-propylene diene rubber, in an extruder under heat and shear stress in the presence of at least one radical donor;
   (b) heating the thermomechanical degraded elastomeric rubber with a semi-crystalline propylene polymer to form a polymer component; wherein the polymer component which contains, in polymerized form, at least 65 wt % of propylene, based on the total weight of the polymer component, to a molten state;
   (c) adding at least one nucleator and at least one functionalized wax, which is polypropylene (co)polymer grafted with a maleic anhydride, into the molten polymer component, wherein the weight ratio of the nucleator to the functionalized wax ranges from about 1:500 to about 50:1; and
   (d) cooling the mixture.

2. The process of claim 1 wherein the polymer component comprises a copolymer of propylene and at least one comonomer, wherein the comonomer is selected from ethylene and/or $C_{4-20}$ alpha-olefins.

3. The process of claim 1 wherein the nucleator is a sorbitol, a sorbitol derivative, a multiple amides component, or a multiple amides component derivative.

4. The process of claim 1 further comprising adding a tackifier, an oil, a non-functionalized wax, a plasticizer, and/or a stabilizer to form a homogeneous mixture after step (c) and before step (d).

* * * * *